United States Patent
Krämer (12)

(10) Patent No.: US 6,185,779 B1
(45) Date of Patent: Feb. 13, 2001

(54) TOOTHBRUSH COMPRISING A FLEXIBLY LINKED REGION IN THE HEAD

(75) Inventor: Hans Krämer, Buehl-Altschweier (DE)

(73) Assignee: SmithKline Beecham Consumer Healthcare GmbH (DE)

( * ) Notice: Under 35 U.S.C. 154(b), the term of this patent shall be extended for 0 days.

(21) Appl. No.: 09/242,605

(22) PCT Filed: Aug. 18, 1997

(86) PCT No.: PCT/EP97/04746

§ 371 Date: Nov. 29, 1999

§ 102(e) Date: Nov. 29, 1999

(87) PCT Pub. No.: WO98/07349

PCT Pub. Date: Feb. 26, 1998

(30) Foreign Application Priority Data

Nov. 18, 1997 (GB) ................................................. 96306134

(51) Int. Cl.[7] .................................................... A96B 9/04
(52) U.S. Cl. ............................ 15/167.1; 15/172; D9/104
(58) Field of Search .................... 15/167.1, 172; D9/104

(56) References Cited

U.S. PATENT DOCUMENTS

| | | | |
|---|---|---|---|
| 2,650,383 | * | 9/1953 | Bressler ................................ 15/167.1 |
| 2,676,350 | * | 4/1954 | Bressler ................................ 15/167.1 |
| 3,152,349 | * | 10/1964 | Brennesholtz ....................... 15/167.1 |
| 3,188,672 | | 6/1965 | Gary . |
| 5,651,158 | * | 7/1997 | Halm ..................................... 15/167.1 |
| 5,802,656 | * | 9/1998 | Dwason et al. ...................... 15/167.1 |
| 5,946,758 | * | 9/1999 | Hohlbein et al. .................... 15/167.1 |
| 5,946,759 | * | 9/1999 | Cann ..................................... 15/167.1 |
| 5,991,958 | * | 11/1999 | Hohlbein .............................. 15/167.1 |

FOREIGN PATENT DOCUMENTS

| | | | | |
|---|---|---|---|---|
| 2652245 | * | 3/1991 | (FR) | .................... 15/167.1 |
| 92 17093 | | 10/1992 | (WO) . | |
| 96 02165 | | 2/1996 | (WO) . | |

* cited by examiner

Primary Examiner—Terrence R. Till

(57) ABSTRACT

A toothbrush having a head (2) which is made flexible by virtue of being made in the form of a number of segments (2A–E), each linked by thin integral links (7) of defined thickness and length, and the link may also incorporate an elastomeric material (9) to modify flexibility. The invention provides improved flexibility characteristics of the head.

14 Claims, 2 Drawing Sheets

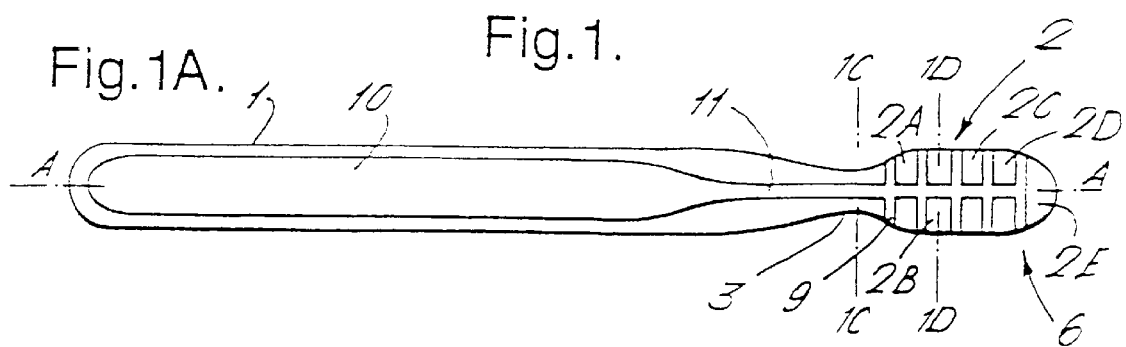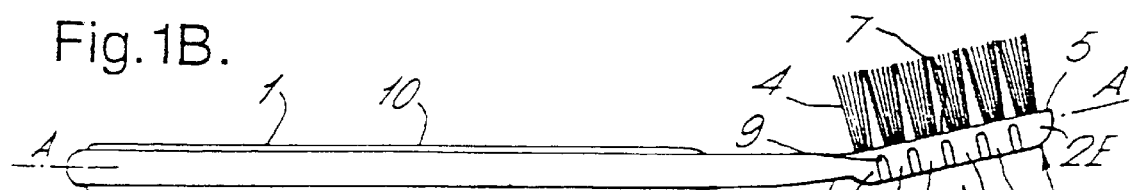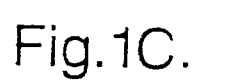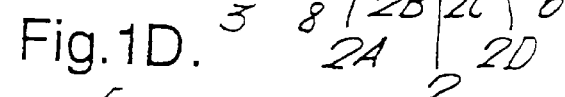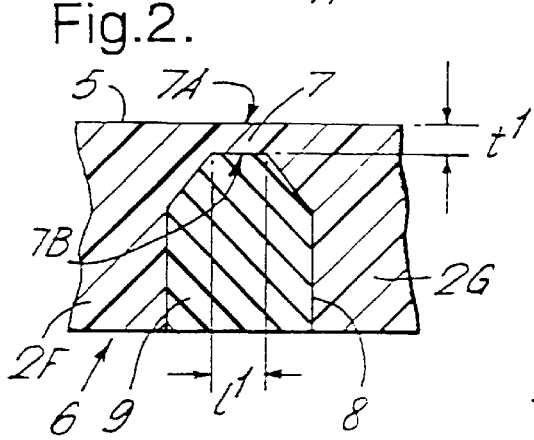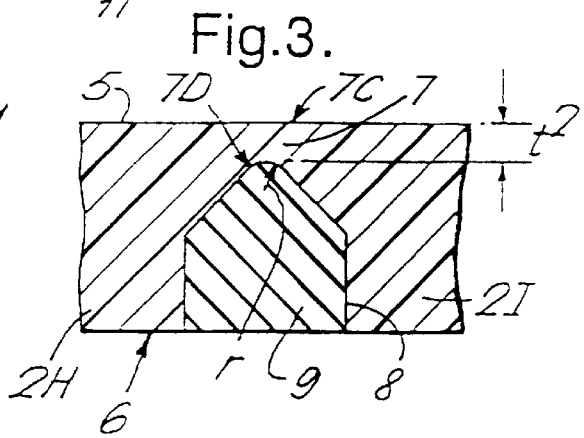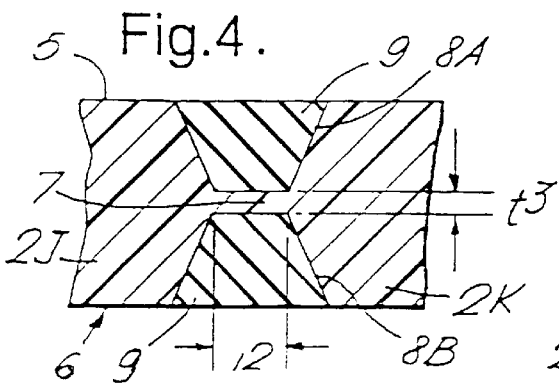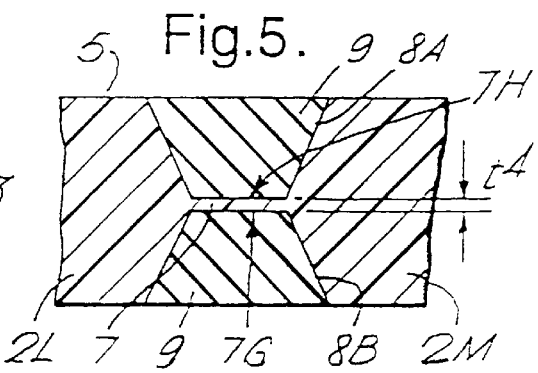

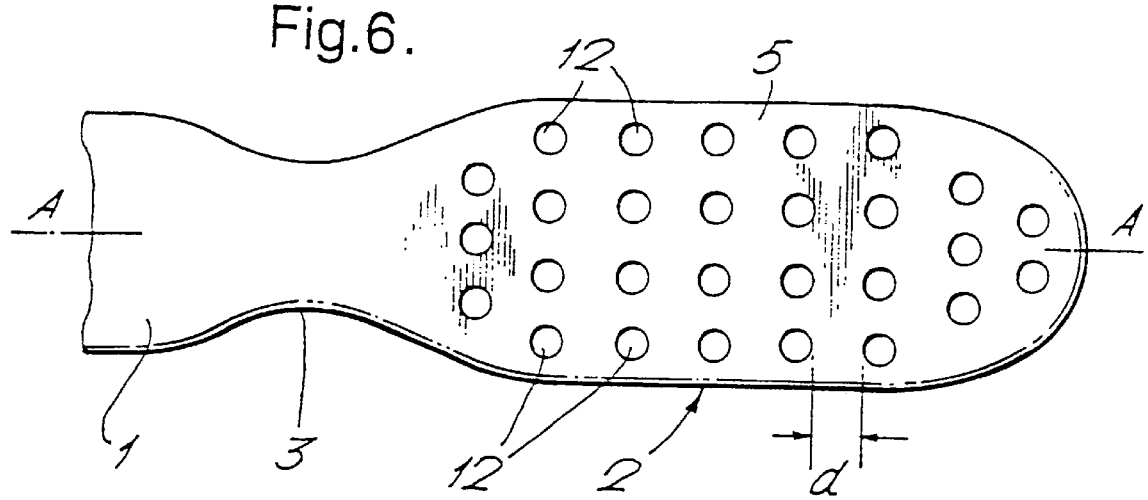
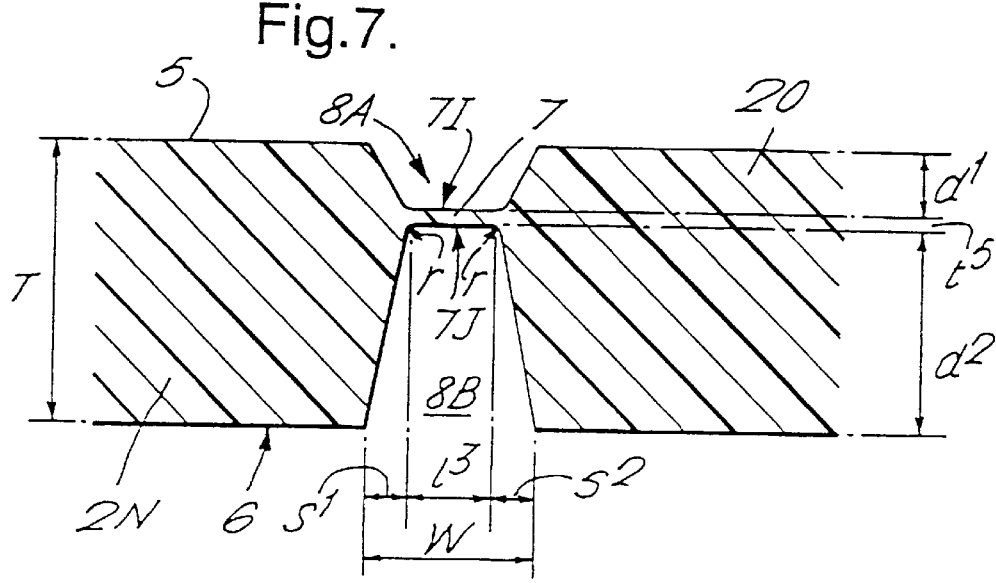

TOOTHBRUSH COMPRISING A FLEXIBLY LINKED REGION IN THE HEAD

CROSS-REFERENCE TO RELATED APPLICATIONS

This is a U.S. National Phase application of PCT/EP97/04746, filed Aug. 18, 1997, which claims priority to GB 96306134.6, which was filed in the Great Britain on Nov. 18, 1997, all of which are incorporated herein by reference.

BACKGROUND OF THE INVENTION

Generally toothbrushes comprise a plastics material handle with a plastics material head adjoining the handle at a base end of the head, generally via a neck region, the head and handle being disposed along a longitudinal toothbrush axis, the head having bristles extending from a bristle face of the head which is an opposite head surface to a back face of the head. The direction between the bristle face and the back face being is defined as the thickness of the head. Bristles are generally distributed in bristle tufts mounted in socket holes in the bristle face, or may be fused into the head material.

Toothbrushes having a flexibly linked region in their head are known. For example WO 92/17093 discloses a toothbrush in which the head is divided into two or more segments which are flexibly and resiliently linked to each other and/or to the handle of the toothbrush. A particular form of the toothbrush of WO 92/17093 has a head which has grooves in the back face of the head, these grooves being filled with an elastomer material to modulate the flexibility of the head. The embodiments disclosed in WO 92/17093 have their grooves distributed in a generally uniform distribution over the reverse face of the head, or around the longitudinal mid point of the head, so as to enable the whole head to accommodate itself to the curved shape of the teeth. WO 96/02165 discloses toothbrushes with flexible heads similar in construction to those of WO 92/17093, and having a generally concave profile of bristle ends. DE-G 87 05 474.4 discloses a toothbrush in which the tip region of the head is hinged to a base region of the head and an operating button on the handle allows the tip region to fold relative to the base region. WO 97/24048 discloses a toothbrush in which the head is divided into two portions, having a flexible link about half way along the head.

SUMMARY OF THE INVENTION

It is an object of this invention to provide a toothbrush with a flexible head in which the flexibility of the head is improved and ideally optimised.

According to a first aspect of this invention a toothbrush comprises a plastics material handle with a plastics material head adjoining the handle at a base end of the head, the head and handle being disposed along a longitudinal toothbrush axis, the head having bristles extending from a bristle face of the head and having an opposite back face, the head comprising at least two adjacent segments integrally linked by a flexible link of the plastics material of the head, a first surface of the link being in the same surface as either the bristle face or the back face of the head, characterised in that the minimum thickness of the link is between 0.2 and 2.0 mm.

The term "thickness" as used herein refers to the dimension measured in the direction between the bristle face and the opposite back face.

Preferably the minimum thickness of the link is between 0.5 and 1.0 mm, most suitably between 0.2 and 0.5 mm.

Preferably the minimum length of the link between adjacent linked segments is at most 0.4 mm.

Preferably the minimum thickness of the link is 0.2 to 0.3 mm, and the minimum length of the link between adjacent linked segments is at most 0.3 mm, desirably 0.2 mm.

In one embodiment of this first aspect of the invention the link is in the form of a strip of the plastics material having a second surface opposite to and substantially parallel to the said first surface.

The link is preferably linear between the linked segments, and may suitably also be linear oriented across the longitudinal axis of the head, or parallel to the longitudinal axis of the head. By "linear" is meant that the link is constructed to flex along a fold axis, and in a "linear" link the fold axis follows a substantially straight line. Alternatively the link may follow a curved, chevron or zig-zag linear path as seen in plan view onto the bristle face or back face of the head.

According to a second aspect of this invention a toothbrush comprises a plastics material handle with a plastics material head adjoining the handle at a base end of the head, the head and handle being disposed along a longitudinal toothbrush axis, the head having bristles extending from a bristle face of the head, and an opposite back face, the head comprising at least two adjacent segments integrally linked by a flexible link of the plastics material of the head, a first surface of the link being in the same surface as either the bristle face or the back face of the head, characterised in that the minimum thickness of the link is between 0.2 and 0.5 mm, and the link has a second surface opposite to the first surface, the second surface being a cylindrically or conoidally concave surface having a radius of curvature of between 0.1 and 2.0 mm, the radius being aligned in the direction generally perpendicular to the linked direction.

Preferably the minimum thickness of the link is 0.2 to 0.3 mm, and the radius of curvature is 0.3–1.4 mm. The concave surface is preferably a cylindrically concave surface.

The link is preferably linear between the linked segments, and may suitably be linear oriented across the longitudinal axis of the head, or parallel to the longitudinal axis of the head. Alternatively the link may follow a curved, chevron or zig-zag linear path as seen in plan view onto the bristle face or back face of the head.

In these two aspects of the invention, if the first surface is the same surface as the bristle face and the toothbrush head has bristle tufts mounted in socket holes in the bristle face, the minimum distance between the edges of adjacent socket holes is preferably no less than 0.45 mm, particularly no less than 0.55 mm.

According to a third aspect of this invention a toothbrush comprises a plastics material handle with a plastics material head adjoining the handle at a base end of the head, the head and handle being disposed along a longitudinal toothbrush axis, the head having bristles extending from a bristle face of the head, and an opposite back face of the head, the head comprising at least two adjacent segments integrally linked by a flexible link of the plastics material of the head, the link being situated intermediate between the bristle face and the back face of the head, characterised in that the maximum thickness of the link is between 0.2 and 3.0 mm.

Preferably the length of the link between adjacent linked segments is 1.0 to 2.5 mm, suitably 1.0 to 1.5 mm.

Preferably the maximum thickness of the link is between 0.2 and 0.4 mm, and the length of the link between adjacent linked segments is 1.0 to 2.0 mm.

In one embodiment of this third aspect of the invention the link is in the form of a strip of the plastics material having a first surface facing in the direction of the bristle face, and an opposite second surface facing in the direction of the back face, both the said first and second surfaces being substantially parallel to the bristle face of the head.

The link is preferably linear between the linked segments, and may suitably be linear oriented across the longitudinal axis of the head, or parallel to the longitudinal axis of the head. Alternatively the link may follow a curved, chevron or zig-zag linear path as seen in plan view onto the bristle face or back face of the head.

The link of this third aspect may be nearer to either the bristle face or the opposite face of the toothbrush, for example nearer to the bristle face.

In all of the above aspects of the invention the link may link segments which are sequentially longitudinally arranged along the longitudinal direction of the toothbrush head. In such a construction the link will preferably extend substantially widthways across the head, i.e with a fold axis across the head. Such a link may extend across the whole width of the head or partly across the width of the head, e.g there may be apertures in the head material between links.

For example the link may be a link which links longitudinally adjacent plastics material segments of the toothbrush head, and being in the form of a thin integral strip of plastics material extending across the head of the toothbrush between the linked segments, hence having a fold axis across the said head.

In all of the above first second and third aspects of the invention the linked segments comprising the head will be thicker than the link, toothbrush heads being typically 3 to 6 mm thick. The provision of the above-described links will consequently result in chasms in the plastics material of the bristle face and/or the back face of the head, i.e as the said plastics material thins to form the integral link between the linked segments, with the link at the bottom of the chasm, and the chasm may be wholly or partly filled with an elastomeric material. Preferably the said link lies at the bottom of a chasm in the plastics material of the toothbrush head, and the said chasm contains an elastomeric material. e.g. to make up the depth of the chasm.

In the first, second and third aspects of the invention the dimensions of the plastics material parts of links described are such that the links are both flexible and resilient. The use of an elastomer material as described above to fill a chasm in the toothbrush head in these aspects may be additionally used to modify the flexibility and resilience of the link, in forming a composite link region comprised of both the plastics material link and the infilling of elastomer.

According to a fourth aspect of this invention a toothbrush comprises a plastics material handle with a plastics material head adjoining the handle at a base end of the head, the head and handle being disposed along a longitudinal toothbrush axis, the head having bristles extending from a bristle face of the head, and having an opposite back face, the head comprising at least two adjacent segments integrally linked by a flexible link of the plastics material of the head, characterised in that the maximum thickness of the link is at most 0.2 mm, the said link lying at the bottom of a chasm in the plastics material of the toothbrush head, the chasm containing an elastomeric material bonded to the said link to form a composite plastics material/elastomer material link between the segments.

Suitably the length of the link, between adjacent linked segments in this fourth aspect of the invention is between 0.5 and 3.0 mm, e.g 0.8–1.6 mm, e.g around 1.2 mm.

In this fourth aspect of the invention one surface of the link may be in the same surface as the bristle face or the back face of the head, or alternatively the link may be formed at an intermediate position in the thickness of the head between the bristle face and the back face of the head.

In one embodiment of this fourth aspect of the invention the link is in the form of a strip of the plastics material having a first surface and an opposite second surface, both the said first and second surfaces being substantially parallel to the bristle face, or the back face, of the head.

The link is preferably linear between the linked segments, and may suitably be linear oriented across the longitudinal axis of the head, or parallel to the longitudinal axis of the head. Alternatively the link may follow a curved, chevron or zig-zag linear path as seen in plan view onto the bristle face or back face of the head.

In this fourth aspect of the invention the link may link segments which are sequentially longitudinally arranged along the longitudinal direction of the toothbrush head. In such a construction the link will extend widthways across the head, i.e with a fold axis across the head. Such a link may extend across the whole width of the head or partly across the width of the head, e.g there may be apertures in the head material between links.

In the fourth aspect of the invention the dimensions of the plastics material parts of links described are such that the link is flexible but has little or no effective resilience. The use of an elastomer material as described above to fill one or more chasms in the toothbrush head in this fourth aspect is to modify the flexibility and resilience of the link, in forming a composite link region comprised of both the plastics material link and the infilling of elastomer.

In all of the above described embodiments the nature, dimensions and orientation of the segments, the link(s) and/or the chasms between segments may differ at different parts of the head, e.g to provide different degrees of flexibility at different places on the head, e.g to make the parts of the head toward the tip of the head remote from the handle more, or less, flexible than parts of the head toward the base of the head. For example greater flexibility may be achieved by thinner links. For example the links may be thicker or longer as between linked segments at some regions of the toothbrush head than at other regions. For example when the link lies at the bottom of two chasms respectively in the bristle face and the opposite back face, i.e by virtue of the link being at an intermediate position in the toothbrush head between the bristle face and the opposite back face, the relative width, depth, shape or taper of the two chasms may be the same or different, for example to encourage the toothbrush head to fold more preferably in one direction than another.

Typically the toothbrush heads of the invention will have a thickness, i.e the dimension between the bristle face and the opposite back face of the head, of 3–6 mm, generally around 4–5 mm, e.g 4.2±0.3 mm.

The toothbrush of the invention can be made by known one-(i.e plastics material only) or two-(plastics material and elastomer material) component injection moulding techniques. In all of the above aspects of the invention when there are two or more composite links comprising plastic material and elastomeric material, and/or if there are other regions of elastomer in the toothbrush structure, e.g additional flexible regions or an elastomeric grip pad, the elastomer in the links and/or in the other regions of elastomer may be linked by moulding channels in the plastics material of the toothbrush head and if appropriate the neck and handle. Such elastomer is normally introduced into the toothbrush structure by an injection moulding operation, of a known nature, in which hot fluid elastomer is injected into the toothbrush structure under conditions which cause bonding between the elastomer and the plastics material.

Such moulding channels minimise the number of injection moulding points needed for the injection of fluid elastomer. Such channels may run longitudinally along the toothbrush and may, in consequently creating thinned areas of the plastics material wholly or partly filled with an elastomer, e.g grooves or surface channels in the plastics material parts, contribute to the flexibility of the toothbrush head or the entire toothbrush structure. In particular if the link(s) link segments which are sequentially longitudinally arranged along the longitudinal direction of the toothbrush head, longitudinally oriented moulding channels of this type may be employed to join them.

Other features of the construction of the toothbrush of this invention, e.g the handle, bristles, neck region or other flexible regions within the toothbrush structure may be generally conventional.

Suitable plastics materials for the plastics material parts of the toothbrush of this invention include the plastics materials widely used for manufacture of toothbrushes, e.g polyesters, PBT, polypropylene and polyamides, for example the plastics materials disclosed in GB 2216785A. An example of a suitable polypropylene is the material "Polypropylene PM 1600" marketed by Shell. Suitable elastomer materials include the elastomer materials widely used for manufacture of the elastomeric grip pads and flexible link parts of toothbrushes, e.g TPE, SBS (styrene-butadiene-styrene block copolymer) and SEBS (styrene-ethylene-butylene-styrene block copolymer), for example available from Gummiwerk Kraiburh GmbH & Co., Waldkraiburg (DE), and "PTS THERMOFLEX 75" having a modulus of elasticity (ISO 178) of 100 Mpa and a hardness (ISO 868) of 80 Shore A, marketed by Plastic Technologie Service, Germany. Such elastomers may be chemically or physically treated, e.g by foaming or plasticising to modify their compressibility.

BRIEF DESCRIPTION OF THE DRAWINGS

The invention will now be described by way of example only with reference to the accompanying figures which show:

FIG. 1 an overall view of a toothbrush of the first, second and third aspects of this invention.

FIG. 2 an enlarged section of a link according to the first aspect of this invention.

FIG. 3 an enlarged section of a link according to the second aspect of this invention.

FIG. 4 an enlarged section of a link according to the third aspect of this invention.

FIG. 5 an enlarged section of a link according to the fourth aspect of this invention.

FIG. 6 an enlarged detail of the bristle face of a toothbrush head of the invention.

FIG. 7 an enlarged section of another link according to this invention.

DETAILED DESCRIPTION OF THE INVENTION

Referring to FIG. 1, FIG. 1A shows a generalised overall back view of a toothbrush of this invention, and FIG. 1B shows a generalised side view of a toothbrush of this invention. The toothbrush consists of a plastics material handle (1) with a plastics material head (2) adjoining the handle at the base end of the head, via a neck region (3), the head and handle being disposed along a longitudinal toothbrush axis I—I. The head (2) has bristles (4) extending from a bristle face (5) of the head, which is an opposite head surface to a back face (6) of the head (2). The direction between the bristle face and the back face "t" is defined as the thickness of the head (2) and is ca. 5 mm. Bristles (4) are distributed in bristle tufts mounted in socket holes in the bristle face (5), but may be fused into the head material.

The head (2) comprises a number of adjacent segments (2A, 2B, 2C, 2D, 2E) integrally linked by a flexible link (7) of the plastics material of the head, a first surface of the link (7) being in the same surface as the bristle face (5) of the head (2). Each link (7) comprises a thin strip of plastics material at the bottom of a chasm (8) in the plastics material of the head (2), the chasm being filled with an elastomeric material (9), thereby forming a composite link. In FIG. 1 these links (7) are shown in a generalised manner and are shown in FIGS. 2 to 5, and described below, in more detail with discussion of alternative constructions.

The toothbrush head may comprise any number of such segments (2A etc.) two being a convenient number.

The handle (1) incorporates an elastomeric grip pad (10) which is integrally linked by elastomeric material in a moulding channel (11) with the chasms (8) in the head. The moulding channel (11) comprises a surface groove in the neck (3) and head (2), FIGS. 1C and 1D showing cross sections at II—II and III—III respectively.

Referring to FIG. 2 an enlarged longitudinal section of the region of the head around a link (7) is shown in more detail. The link (7) comprises a flexible link of the plastics material of the head, a first surface (7A) of the link being in the same surface as bristle face (5) of the head. The minimum thickness of the link, "$t^1$", is between 0.2 to 0.3 mm, and the minimum length of the link "$I^1$", between adjacent linked segments (2F, 2G) is at most 0.2 mm. The link (7) is in the form of a strip of the plastics material having a second surface (7B) opposite to and substantially parallel to the first surface (7A). The link (7) shown is linear between the linked segments (2F, 2G), and is oriented across the longitudinal axis I—I of the head. It will be apparent that FIG. 2 equally well represents a link (7) having its first surface in the same surface as back face (6) of the head (2). In FIG. 2 the elastomer filling (9) is shown, and the chasm (8) is shown as being parallel sided near the surface and tapering toward the link (7) at its bottom.

Referring to FIG. 3 an enlarged longitudinal section of the region of the head around a link (7) is shown in more detail. The link (7) comprises a flexible link of the plastics material of the head, a first surface (7C) of the link being in the same surface as bristle face (5) of the head. The minimum thickness of the link, "$t^2$", is between 0.2 to 0.3 mm. The link has a second surface (7D) opposite to the first surface (7C), the second surface (7D) being a cylindrically or conically concave surface having a radius of curvature "r" of between 0.1 and 2.0 mm, the radius being aligned in the direction generally perpendicular to the linked direction, i.e generally perpendicular to the axis I—I. The link (7) shown is linear between the linked segments (2H, 2I), and is oriented across the longitudinal axis I—I of the head. It will be apparent that FIG. 3 equally well represents a link (7) having its first surface in the same surface as back face (6) of the head (2). In FIG. 3 the elastomer filling (9) is shown, and the chasm (8) is shown tapering toward the link (7) at its bottom.

Referring to FIG. 4 an enlarged longitudinal section of the region of the head around a link (7) is shown in more detail.

The link (7) comprises a flexible link of the plastics material of the head, the link (7) being situated intermediate between the bristle face (5) and the back face (6) of the head. The maximum thickness "t³", of the link (7) is between 0.9 and 1.2 mm, and the length "I²", of the link between adjacent linked segments (2J, 2K) is 1.5 mm. The link (7) is in the form of a strip of the plastics material having a second surface (7E) opposite to and substantially parallel to its first surface (7F).

The link (7) shown is linear between the linked segments (2J, 2K), and is oriented across the longitudinal axis I—I of the head. In FIG. 4 the elastomer filling (9) is shown, and the two chasms (8) in the bristle face (5) and back face (6) are shown as tapering toward the link (7) at their bottom.

In FIGS. 2, 3 and 4 the plastics material link (7) has dimensions such that it has flexibility and resilience.

Referring to FIG. 5 an enlarged longitudinal section of the region of the head around a link (7) is shown in more detail. The link (7) comprises a flexible link of the plastics material of the head, the link (7) being situated intermediate between the bristle face (5) and the back face (6) of the head. The maximum thickness "t⁴", of the link (7) is less than 0.2 mm. The link (7) is in the form of a strip of the plastics material having a second surface (7G) opposite to and substantially parallel to its first surface (7H).

The link (7) shown is linear between the linked segments (2L, 2M), and is oriented across the longitudinal axis I—I of the head. In FIG. 5 the elastomer filling (9) is shown, and the two chasms (8A, 8B) in the bristle face (5) and back face (6) respectively are shown as tapering toward the link (7) at their bottom, being wider toward respectively the bristle face (5) and the opposite back face (6). The taper of the two chasms (8A, 8B) may be the same or different, for example to encourage the toothbrush head to fold more preferably in one direction than another.

In FIG. 5 the plastics material link (7) has dimensions such that it has flexibility but virtually no resilience, and serves principally as a link holding the linked segments (2L, 2M) together, the strength, flexibility and resilience being determined primarily by the properties of the elastomer infilling (9).

Referring to FIG. 6, the region of the bristle face (5) is shown in more detail. The head (2) of the toothbrush of FIG. 6 may include any of the types of link (7) discussed above, so the detail of the link is not shown. The bristles (4, not shown in FIG. 6) are arranged in discrete tufts which are mounted in bristle socket holes (12) in the bristle face (5). The socket holes (12) are generally circular. The distance "d" between the edges of adjacent socket holes (12) is greater than 0.55 mm.

Referring to FIG. 7 an enlarged longitudinal section of the region of the head around a link (7) is shown in more detail. The link (7) comprises a flexible link of the plastics material of the head, the link (7) being situated intermediate between the bristle face (5) and the back face (6) of the head, the thickness T of the head (2) being 4–5 mm, e.g 4.2±0.3 mm. The maximum thickness "t⁵", of the link (7) is 0.2 mm±0.1 mm. The link (7) is in the form of a strip of the plastics material having a second surface (7I) opposite to and substantially parallel to its first surface (7J). The length 13 of link (7) between the linked segments (2N, 2O) is 1.2 mm±0.3 mm.

The link (7) shown is linear between the linked segments (2N, 2O), and is oriented across the longitudinal axis I—I of the head. In FIG. 7 the elastomer filling (9) is present but for clarity is not shown, and the two chasms (8A, 8B) in the bristle face (5) and back face (6) respectively are shown as tapering toward the link (7) at their bottom, being wider toward respectively the bristle face (5) and the opposite back face (6) than at their bottom surface i.e the link (7). At their widest, in the surfaces (5, 6) of the toothbrush head the width W of the chasms (8A, 8B) is 2.4 mm±0.3 mm. The depth $d^1$ of the chasm (8A) in the bristle face is 0.9±0.4 mm, and the depth $d^2$ of the chasm (8A) in the bristle face is 3.1±0.4 mm. The taper of the two chasms (8A, 8B) may be the same or different, for example to encourage the toothbrush head to fold more preferably in one direction than another. In FIG. 7 the slopes of the sides of the chasms (8A, 8B) are such that their respective depths $d^1$ and $d^2$ are attained in slopes $s^1$ and $s^2$ of 0.5–0.7 mm. Each of the bottom corners of the chasms (8A, 8B) has a radius of 0.2–0.4 mm, e.g. 0.3 mm.

The link (7) in FIGS. 1 to 7 also serves to allow all of the various linked segments (2A–2O) of the head to be integrally linked by plastics material, enabling formation by injection of fluid plastics material at a single injection point.

What is claimed is:

1. A toothbrush comprising:
   a handle;
   a plastic head connected to the handle, the head having a bristle face and a back face, the head also including a first bristled segment and a second bristled segment, the head further including a link region between the first and second bristled segments, the link region including a flexible link integrally connecting the first and second bristled segments, the flexible link being a thin strip of plastic material extending substantially widthwise across the head of the toothbrush between the linked segments and defining a fold axis oriented widthways across the head, the link being disposed between the bristle face and the back face of the head, the maximum thickness of the link being between 0.2 and 3.0 mm,
   wherein the link region includes at least two chasms, including a first chasm on the bristle face and a second chasm on the back face of the head, the chasms extending part way through the thickness of the head and defining tapered surfaces to form the link, so that the chasms are wider at the bristle face and at the back face of the head, while being narrower adjacent the link.

2. A toothbrush according to claim 1, wherein the maximum thickness of the link is between 0.2 and 0.4 mm.

3. A toothbrush according to claim 1, wherein the maximum thickness of the link is between 0.9 and 1.2 mm.

4. A toothbrush according to claim 1, wherein the length of the link between adjacent linked segments is between 1.0 to 2.5 mm.

5. A toothbrush according to claim 4, wherein the length of the link between adjacent linked segments is between 1.0 to 2.0 mm.

6. A toothbrush according to claim 5, wherein the length of the link between adjacent linked segments is between 1.0 to 1.5 mm.

7. A toothbrush according to claim 1, wherein the link is closer to the bristle face than the back face.

8. A toothbrush according to claim 1, wherein the relative depth of the at least two chasms is different.

9. A toothbrush according to claim 1, wherein the relative shape of the at least two chasms is different.

10. A toothbrush according to claim 1, wherein the relative taper of the at least two chasms is different.

11. A toothbrush according to claim 1, wherein the dimensions of the segments, the link and/or the chasms between segments differs at different parts of the head.

12. A toothbrush according to claim 1, wherein the orientation of the segments, the link and/or the chasms between segments differs at different parts of the head.

13. A toothbrush according to claim 1, wherein the chasms contain an elastomeric material.

14. A toothbrush comprising:

a plastic handle;

a plastic head adjoining the handle at a base end of the head, the head and handle being disposed along a longitudinal toothbrush axis, the head having two faces, a bristle face from which bristles extend, and an opposite back face, the head comprising at least two adjacent segments integrally linked to each other by a flexible link comprising a thin integral strip of plastic material extending substantially widthwise across the head of the toothbrush between the linked segments to define a fold axis oriented widthways across the head, and being integrally made of the plastic material of the head, a first surface of the link being in the same surface as either the bristle face or the back face of the head;

wherein the minimum thickness of the link is between 0.2 and 0.5 mm, and the link has a second surface opposite to the first surface, the second surface being a cylindrically or conically concave surface having a radius of curvature of between 0.1 and 2.0 mm, the radius being aligned in the direction generally perpendicular to the linked direction, wherein the head has at least one chasm in the plastic material of the head that is located on either the bristle face or the back face; and wherein the chasm extends part way through the thickness of the head and tapers to form the link, so that said chasm is wider along a face of the head and narrower at the bottom of the at least one chasm.

* * * * *